United States Patent [19]

Yamamoto et al.

[11] Patent Number: 4,654,135

[45] Date of Patent: Mar. 31, 1987

[54] ELECTROLYTIC CELL FOR SEA WATER

[75] Inventors: Shinichiro Yamamoto, Okayama; Shigeki Sudo, Tamano; Tsuyoshi Ohmizu, Okayama, all of Japan

[73] Assignee: Chlorine Engineers Corp. Ltd., Tokyo, Japan

[21] Appl. No.: 809,300

[22] Filed: Dec. 16, 1985

[30] Foreign Application Priority Data

Jan. 14, 1985 [JP] Japan .................................. 60-2390

[51] Int. Cl.$^4$ ........................ C25B 9/00; C25B 11/03
[52] U.S. Cl. .................................... 204/269; 204/284
[58] Field of Search .............................. 204/253–258, 204/267–270, 95, 263, 284

[56] References Cited

U.S. PATENT DOCUMENTS 3,119,760  1/1964  Foreman et al. ...................... 204/269
4,495,048  1/1985  Murakami et al. .............. 204/269 X

FOREIGN PATENT DOCUMENTS 2446331  9/1980  France ................................. 204/257

Primary Examiner—Donald R. Valentine
Attorney, Agent, or Firm—Kuhn Muller and Bazerman

[57] ABSTRACT

A cell is disclosed whereby sea water is electrolyzed to form an aqueous hypochlorite solution with reduced formation of interfering deposits on the electrodes. The cell comprises a plurality of electrolytic cell units having a pair of cathodes and an anode placed between said cathodes, an electrolyte inlet at the lower part of an end frame, an electrolyte outlet at the upper part of an end frame. One of a pair of cathodes has an aperture at a position corresponding to the inlet, and the other cathode has an aperture at a position corresponding to the outlet. The anode has apertures at the position corresponding to the inlet and outlet.

4 Claims, 2 Drawing Figures

ELECTROLYTIC CELL FOR SEA WATER

BACKGROUND OF THE INVENTION

1. Field of the Invention

The present invention relates to a filter-press type electrolytic cell for sea water to obtain sodium hypochlorite from the sea water without substantial formation of such deposits as calcium and magnesium components in the sea water, upon the surface of cathodes.

2. Description of the Prior Art

In the electrolytic cell for sea water, calcium carbonate and magnesium hydroxide which deposits on cathode surfaces leads to increase in operating cell voltage and decrease in current efficiency, and builds up thicknesses that impede or prevent electrolyte flow. Electrolysis is then intermittently interrupted, unless some procedures such as backwash, acidwash are taken to remove these deposits.

In many conventional electrolytic cells for sea water, with vertically disposed electrodes, the sea water enters to the cell below the electrodes. Since the sea water is in contact with the bottom edge of the electrodes, the deposits of magnesium and calcium components in the sea water are unavoidable.

In order to remove this disadvantage, a preventive of such deposits, by means of the round-bottomed electrodes or wedge-bottomed electrodes, is proposed by the Utility Model Application in Japan published under No.JP(U)79-143361(Jikkaisho 54-143361). Deposits of the components of sea water are considerably reduced by this method, but deposits should not be completely prevented if the content of hardness components in sea water is high or the operation runs for a long time.

On the other hand, the electrolytic cell with vertically mounted cell units, is publicly known by the Patent Application in Japan published under NO.JP(A) 83-171587 (Tokkaisho 58-171587). However, in this patent application no disclosure is given with regard to the deposits of metallic components of sea water nor the passage of electrolyte in the cell unit.

SUMMARY OF THE INVENTION

The inventors of the present invention noted that deposits of metallic components on the cathode surfaces in conventional electrolytic cells is caused by contact with the bottom edges of cathodes.

It is a major object of the present invention to provide an electrolytic cell without deposits of metallic components such as magnesium hydroxide and calcium carbonate on the cathode surface.

This invention is a filter-press type electrolytic cell for sea water that comprises: a plurality of vertical electrolytic cell units having anodes and cathodes; spacers, which provide passage connecting an outlet of one electrolytic cell unit to an inlet of the adjacent electrolytic cell unit, each placed between electrolytic cell units; and the inlet and the outlet of electrolyte being arranged respectively at the lower and upper parts of the electrolytic cell unit.

The invention will be more clearly understood with reference to the following examples as shown in attached drawings. However, it is to be understood that the invention is not intended to be limited to any specific embodiments.

DESCRIPTION OF THE PREFERRED EMBODIMENTS

Figure 1:
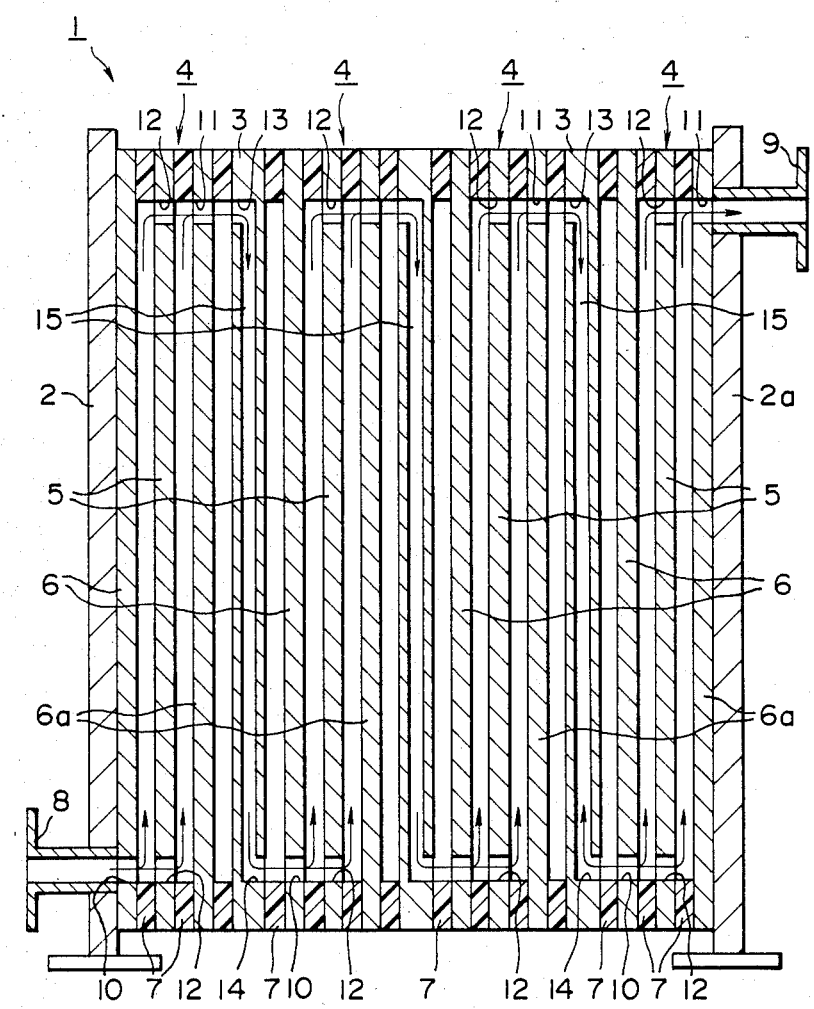
FIG. 1 is a vertical sectional view showing an embodiment of a filter-press type electrolytic cell for sea water under this invention.

The electrolytic cell 1 comprises four vertical electrolytic cell units 4, having a pair of endframes 2,2a at the ends with spacers 3 placed between the electrolytic cell units. Each electrolytic cell unit 4 comprises a laminar anode 5 interposed by a pair of laminar cathodes separated by three gaskets 7. The endmost cathodes 6,6a are, respectively, in contact with endframes 2,2a. At the lower exterior of the endframe 2 showing in the left-hand of FIG. 1, is the electrolyte feeding port 8. At the upper exterior of the endframe 2a showing in the right-hand of said Figure, the electrolyte discharging port 9 is provided. An electrolyte feeding passage 10 penetrates the outermost left cathode at the position corresponding to the above mentioned electrolyte feeding port 8. Likewise, an electrolyte discharge passage 11 connects the electrolyte discharge port and the outermost right cathode.

In the lower and upper parts of the anode 5 two horizontally extended aperture 12 with an oval vertical sections is placed at the positions corresponding to the above mentioned electrolyte feeding and discharge passages 10,11. These electrodes have no other aperture except those at the inlet and outlet. The spacer 3 separating the electrolytic cell units 4 has an upper stream hole 13 and a lower stream hole 14 matching respectively the electrolyte discharging passage 11 of the cathode 6a and the electrolyte feeding passage 10 of the cathode 6. Both stream holes 13 and 14 are connected by a vertical passage 15. Each cathode 6,6a has one or two projecting parts 16 on one side. Said projecting part 16 is connected by the busbar 17 the projecting part 18 of the anode 5 of the adjacent electrolytic cell unit 4.

An explanation of the use of this apparatus in sea water electrolysis follows.

Sea water, as electrolyte, enters electrolytic cell 1 through the electrolyte inlet 8; while electric current is supplied to the anode 5, the electrolyte is electrolyzed in the course of flowing up the interelectrode gaps between the anode 5 and the cathodes 6,6a which interpose the anode, and the partially electrolyzed electrolyte flows down to the connecting passage 15 of the spacer 3 and through the electrolyte outlet 11 of the cathode 6a into the adjacent electrolytic cell unit 4 through the electrolytic inlet 10; to repeat the process, electrolyzing continously. The electrolyte is finally discharged from the electrolytic cell unit 4 at the outside right end of the electrolytic cell 1. In such case, the electric current flows from the anode 5 of the electrolytic cell unit 4 positioned at the left end to its cathodes 6,6a on either side. The current also flows to the anode of the adjacent electrolytic cell unit through the busbar 17; and thus passes in succession through the electrolytic cell 1 causing the electrolysis of sodium chloride to sodium hypochlorite in the electrolyte.

In this example, sea water is introduced to the electrolytic cell 1 from the feeding port on the side. As the bottom edge of cathode is held between gasket 7, sea water does not contact the bottom edges of the cathodes 6,6a in contrast to conventional electrolytic cell. Therefore, deposits of magnesium and calcium components in sea water are not formed. Furthermore, as electrolyte flows from the lower part to the upper part of the electrolytic cell unit 4, the electrolyte is fully electrolyzed in said unit, and the electrolytic efficiency does not decrease.

EXAMPLE 1

Figure 2:
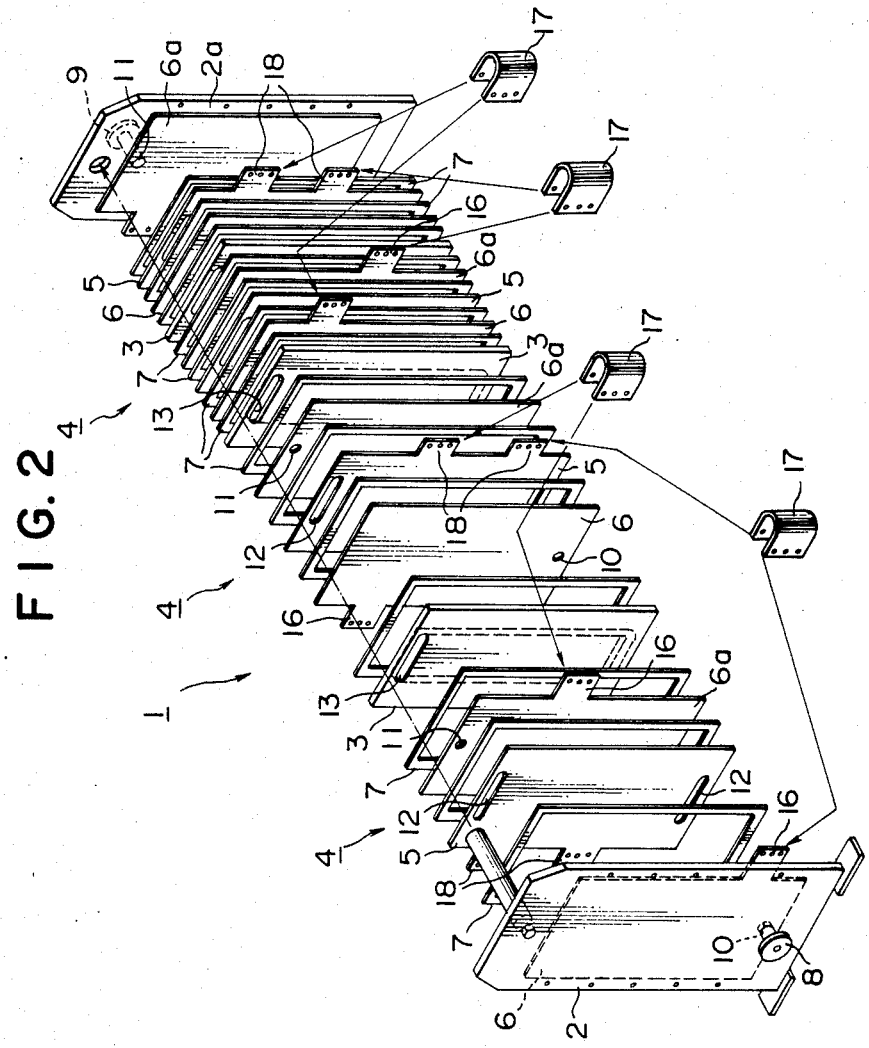
FIG. 2 is an exploded view in perspective diagram of this invention.

An electrolytic cell unit comprises a dimensionally stable anode of 50 cm long, 25 cm wide and 3 mm thick, a pair of stainless steel cathodes of the same shape and two picture frame-like 3 mm gaskets placed between the anode and the cathodes. The electrolytic cell for sea water shown in FIG. 1 and FIG. 2 is formed by four electrolytic cell units with spacers, with passages from top to bottom between said units.

The electrolysis takes place at a sea water flow rate through the cell of 900 liters per hour at 300 amperes of electrolytic current. The concentration of available chlorine in the electrolyte after electrolysis is about 1600 mg per liter at which current efficiency is 85 to 94%.

The electrolytic cell has been operated for 9 months periods of time.

After operation for 9 months periods of time, the electrolytic cell is disassembled, and deposits such as magnesium hydroxide, calcium hydroxide are not substantially observed on the reactive surface.

EXAMPLE 2

The electrolytic cell is assembled with the same elements as Example 1, but in different dimensions. The anodes and cathodes are 100 cm long, 50 cm wide and 3 mm thick and picture frame-like gasket 2 mm thick, and electrolytic cell comprises 2 electrolytic cell units.

The electrolysis goes on at a flow rate of sea water through the cell of 3200 liters per hour, while electric current is fed at 1300 amperes. The concentration of available chlorine in the electrolyte after electrolysis is about 1000 mg per liter and current efficiency is 85 to 95%.

After operation for periods of 8 months, the interior of the electrolytic cell is observed, and deposits are not substantially observed on the reaction surface.

We claim:

1. A filter-press type electrolytic cell for the electrolysis of sea water to produce hypochlorite, which cell comprises:

two endframes; a plurality of vertical electrolytic cell units; spacers, each placed between adjacent electrolytic cell units; each of said cell units having an anode and two cathodes with a gasket placed inbetween; said gasket being picture frame-like and in the same external form as the electrodes; an electrolyte inlet at the lower part of the electrolytic cell unit; an electrolyte outlet at the upper part of the electrolytic cell unit; one of the cathodes of a pair having an aperture at the position corresponding to said inlet and the other cathode having an aperture at the position corresponding to said outlet; anodes having apertures corresponding to the position of the inlet and outlet; each spacer having a passage connecting an electrolyte outlet of one electrolytic cell unit to an electrolyte inlet of the adjacent electrolytic cell unit whereby the electrolyte flows in series from said electrolyte outlet of one cell unit to said electrolyte inlet of the adjacent cell unit.

2. A filter-press type electolytic cell for sea water according to claim 1 wherein said units are connected electrically in series.

3. A filter-press type electrolytic cell for sea water according to claim 1 wherein said electrodes have no apertures except the apertures at the positions corresponding to the inlet and outlet.

4. A filter-press type electrolytic cell for sea water according to claim 1 wherein said electrodes have the horizontally extended apertures with an oval vertical section.

* * * * *